United States Patent [19]
Shurtleff

[11] Patent Number: 5,318,316
[45] Date of Patent: Jun. 7, 1994

[54] CART FOR VERTICALLY ORIENTED LONGITUDINALLY EXTENDING OBJECTS

[76] Inventor: David P. Shurtleff, 12814 - 163rd Ave. S.E., Snohomish, Wash. 98290

[21] Appl. No.: 835,224

[22] Filed: Feb. 12, 1992

[51] Int. Cl.$^5$ .............................................. B62B 1/06
[52] U.S. Cl. .................................. 280/79.7; 269/133; 269/157; 280/47.26; 414/445
[58] Field of Search ................ 280/79.7, 79.11, 655.1, 280/47.17, 47.19, 47.24, 47.26, 47.131; 414/444, 445, 450, 453; 269/133, 157

[56] References Cited

U.S. PATENT DOCUMENTS

| D. 310,894 | 9/1990 | Smith | 280/79.7 |
|---|---|---|---|
| 897,853 | 9/1908 | Von Scheidt | 280/79.7 |
| 1,035,293 | 8/1912 | Wyatt | 280/47.131 |
| 1,161,983 | 11/1915 | Schultz | 269/133 |
| 1,244,419 | 10/1917 | Burns | 269/133 |
| 2,816,771 | 12/1957 | Hunt | 280/47.131 |
| 3,306,624 | 2/1967 | Goss | 280/47.34 |
| 3,717,357 | 2/1973 | Schaefer | 280/79.11 |
| 4,630,838 | 12/1986 | Stockton | 280/79.7 |
| 4,695,067 | 9/1987 | Willey | 280/47.131 |

FOREIGN PATENT DOCUMENTS

1194047 9/1985 Canada .................................. 269/133

Primary Examiner—Eric Culbreth
Attorney, Agent, or Firm—Hughes & Multer

[57] ABSTRACT

Carts for transporting doors, sheets of plywood and dry wall, narrow crates, mirrors, and other large, awkward-to-handle and perhaps fragile articles of similar configurations in a horizontal orientation which allows the object to be freely manipulated through a doorway or other opening. The article is automatically and securely clamped between cooperating fixed and displaceable jaws in the process of loading it into the cart; and the article is thereafter automatically released from the jaws when it is lifted upwardly to remove it from the cart. An easily removable handle makes the cart easy to manipulate and, at the same time, permits it to easily be broken down for storage, shipment, etc. Front and rear, leglike stops limit fore-and-aft tilting of the door cart and thereby facilitate the loading of materials into the cart.

3 Claims, 4 Drawing Sheets

CART FOR VERTICALLY ORIENTED LONGITUDINALLY EXTENDING OBJECTS

TECHNICAL FIELD OF THE INVENTION

The present invention relates to carts and, more particularly, to certain novel carts for moving doors, dry wall, plywood, narrow crates, mirrors, and similarly configured, hard-to-handle and/or fragile objects from one location to another and for holding the object in an orientation which facilitates the subsequent picking up and handling of the object.

One currently important application of the present invention involves the moving of doors from one location to another. For that reason, the novel carts disclosed herein will be identified as door carts; and the principles of the invention will be developed with reference to the just-identified application of the invention. It is to be understood, however, that this approach is being adopted solely for the sale of convenience, clarity, and conciseness and is not intended to limit the scope of protection afforded by the appended claims.

BACKGROUND OF THE INVENTION

Doors and similarly sized and shaped objects such as those identified above are difficult to handle because their size and shape and perhaps considerable weight and because they must often be manipulated through doorways and other openings which require that the object being turned sideways, making it even more difficult to handle.

Cannon and Norfield have accordingly marketed carts which are ostensibly designed to make objects of the character just described easier to handle; i.e., to move from one location to another. The caster-supported Cannon cart is large, bulky, and cumbersome and is intended only for applications in which plywood or lumber is being moved in quantity from one location to another along a smooth, wide, obstruction-free path. Norfield's cart is designed for moving doors in a generally upright position. This has the disadvantage that the user's view of where he is going is obstructed by the door. Furthermore, the bottom of the door is supported from the chassis of the cart, and a bracket at the upper end of the cart handle provides a second locus of support. This arrangement makes it very difficult to tilt the cart and thereby lower the upper end of the door to the extent necessary to manipulate the cart and door through a doorway or other opening, especially a low one.

Other carts designed for handling objects of the character described above are disclosed in the following patent publications:

| Publication Number | Country | Title | Effective Date |
|---|---|---|---|
| 2585655 | France | Trolley for Securely Handling Panels | 6 Feb 1987 |
| 19867 | Great Britain | | 5 Dec 1890 |
| 134082 | Sweden | För Transport of av plåtar och andra skivformiga föremål avsedd kärra förem81 avsedd kärra | 27 Dec 1951 |
| 2816771 | United States | Moving Dolly for Tables and the Like | 17 Dec 1937 |
| 3306624 | United States | Dolly for Moving Boxes of Glass | 28 Feb 1967 |
| 3717357 | United States | Adjustable Dolly Construction | 20 Feb 1973 |

The carts disclosed in the foregoing patent publications do not appear to have ever made it to the marketplace. This is understandable as different ones of these carts have one or more of a variety of drawbacks. These include: complexity; lack of stability; an undesirable degree of difficulty in loading the object into the cart and/or in securing the object in place; a lack of ease in manipulating the cart and its load from one location to another; an unstable relationship between the load and the cart and an inability to be adapted to different types of loads; and inadequate protection of the load from damage.

From the foregoing and the cited documentation, it will be apparent to the reader that there exists a long-standing need for a cart which can be used to transport objects of the character described above from one location to another but does not have drawbacks of the character appurtenant to carts heretofore proposed for the same purpose.

SUMMARY OF THE INVENTION

Such carts have now been invented and are disclosed herein.

These novel carts have a combination chassis and axle supported on rubber tired wheels which are mounted on the opposite ends of the transversely extending, axle-providing chassis. These wheels are large enough and far enough apart that tipping over of the cart is not a problem, even if it is carrying a large and heavy load.

A pair of cooperating, fixed and movable jaws are mounted on the chassis of the cart. These jaws are so designed and related that, as an object is loaded into the cart, the movable jaw is displaced toward the fixed jaw in a manner which results in the load being automatically and securely clamped in place, an objective furthered by a resiliently compressible clamping member attached to the movable jaw.

Both jaws are padded; and soft, protective caps are employed in appropriate locations. As a result, the load is well protected from marring, scratches, and other forms of damage which could easily result from load-and-cart contact if one of the heretofore proposed carts discussed above were employed.

A tension spring biases the movable jaw to a position of maximum displacement relative to the fixed jaw. This significantly facilitates the loading of the object to be transported into the cart. Also, as an upward force is exerted on the cart, the tension spring restores the movable jaw to the initialized position. This makes it very easy to remove the load from the cart.

Objects are typically loaded into carts employing the principles of the present invention in a horizontal orientation with the load's center of mass directly above the chassis/axle of the cart and the load extending equidistantly forward and to the rear from the chassis' axle, thereby optimizing the stability of the loaded cart. Chassis-mounted front and rear legs limit the extent to which a thus loaded cart can be tilted in the fore-aft-direction as it is moved from one location to another and while it is standing in any particular location. This keeps the cart in an upright position while loading and unloading materials when the cart is standing. The load is stabilized by resting one end on the cart-supporting surface.

An upwardly and rearwardly extending, ergonomically designed handle is employed to manipulate and move the cart. This handle, the front and rear stabilizing legs, and the wheels are all attached to the chassis/axle and fixed jaw of the cart in a manner which allows those components to be easily and quickly removed and reinstalled. The result is that the cart can be conveniently broken down into a compact form for packaging, storage, and movement from one site to another. The cart is furthermore easy to handle in its broken down configuration by virtue of an unobtrusive carrying handle permanently attached to the cart's main assembly of chassis/axle, fixed and movable jaws, and related components.

Other important advantages of the carts disclosed herein are that they have only a few components and that the majority of these are off-the-shelf items or can be easily fabricated from stock materials. The result is that carts employing the principles of the present invention are easy and inexpensive to manufacture.

The objects and other features and advantages of the invention will be apparent to the reader from the foregoing and the appended claims and as the ensuing detailed description and discussion proceeds in conjunction with the accompanying drawings.

DETAILED DESCRIPTION

Figure 1:
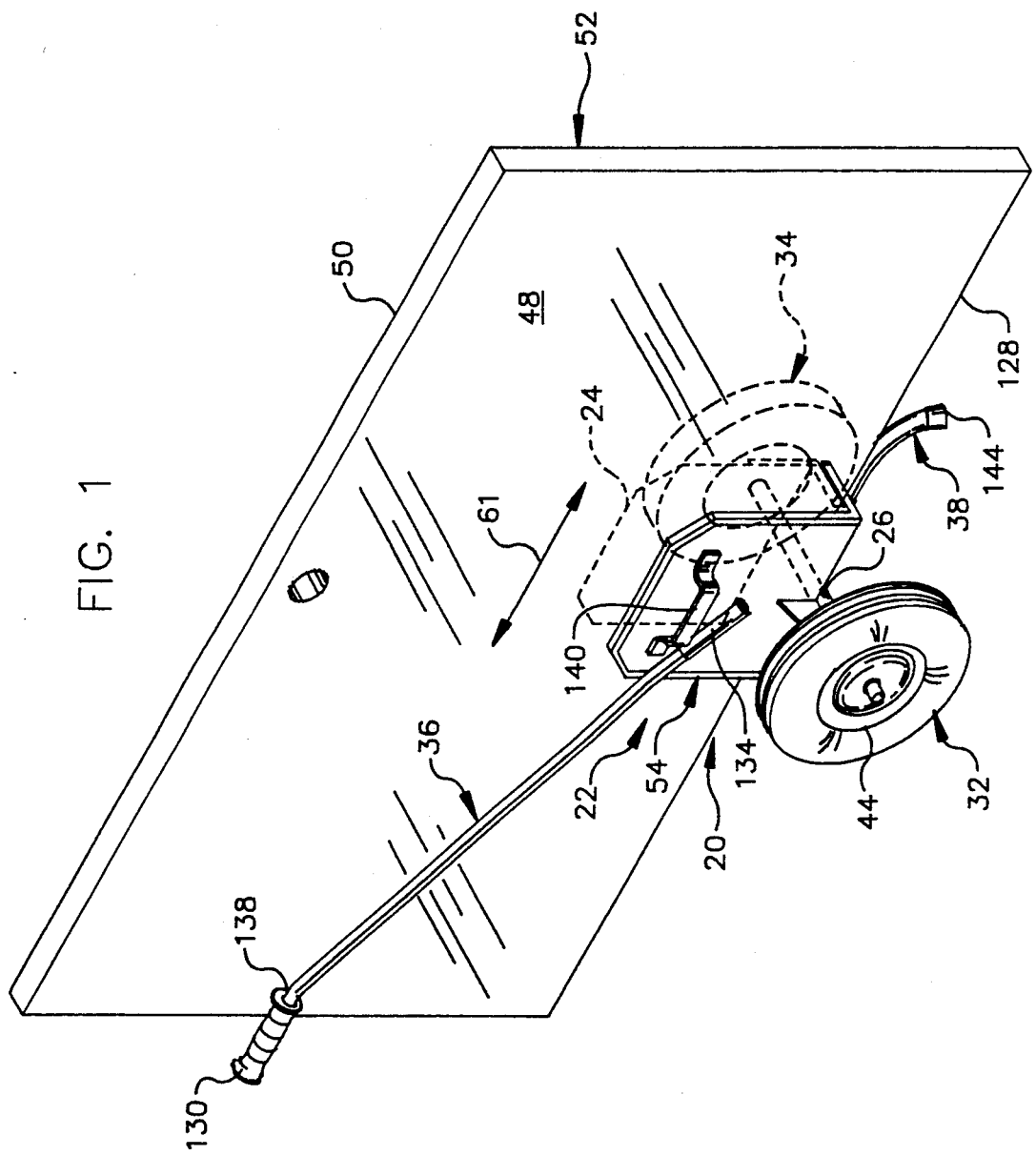
FIG. 1 is a perspective view of: (a) a cart embodying the principles of the present invention, and (b) a door loaded into the cart and automatically and securely locked in place.

Referring now to the drawings, reference character 20 identifies a door cart constructed in accord with, and embodying, the principles of the present invention. The major components of door cart 20 include fixed and displaceable, door gripping jaws 22 and 24 attached to an axle 26; reinforcing gussets 28 and 30, wheels 32 and 34 which make the door cart mobile, a handle 36 for manipulating the door cart; and fore-and-aft, anti-tilting support legs 38 and 40 which orient the door cart as shown in FIG. 1, for example, when it is standing.

Axle 26 serves as a chassis for door cart 20. The axle is a rodlike component with necked down and sections 42. These define shoulders (not shown) which engage the hubs 44 of wheels 32 and 34 to locate the wheels on axle 26. The wheels are retained in place as by cotter pins 46. As the wheels are off-the-shelf items, they will be referred to hereinafter only to the extent necessary for an understanding of the present invention.

The above-mentioned jaws 22 and 24 grip opposite sides 48 and 50 of a door such as that identified by reference character 52 and FIG. 1 and, with the door centered on cart 20 as shown in the same figure, securely support the door on chassis 26.

Fixed jaw 22 includes a rigid, typically plate metal structural component 54 with a generally U-shaped configuration generated by long and short, spaced apart, vertical legs 56 and 58 and an integral, horizontally orientable base 60. The base 60 of component 54 is welded or otherwise fixed to door cart axle or chassis 26 midway between wheels 32 and 34 with the base segment 50 and vertical component legs 56 and 58 extending in the fore-and-aft direction identified by arrow 61 in FIG. 1.

Rigidity and structural integrity are added to the jaw component/chassis assembly thus provided by gussets 28 and 30. As is best shown FIGS. 2 and 3, these are trapezoidally configured components typically fabricated from sheet or plate stock. They are oriented in the same direction as axle 26—i.e., at right angles to fixed jaw structural component 54—and are fixed to the vertically extending legs 56 and 58 of that component and to axle 26 as by welding. The inner side 62 of fixed jaw support component 54 is faced with carpeting 64 which has a synthetic sponge or other force absorbing backing 66 surfaced with fabric 68. Carpeting 64 extends down over vertical jaw component leg 56 and across the base 60 of that component and is employed to keep door 52 from being scratched or otherwise marred as it is loaded onto, transported by, and unloaded from door cart 20. A plastic or other cap 70, extending along the edges of rigid fixed jaw component leg 56 and fastened to that component and carpeting 64 as with an appropriate adhesive, offers additional protection against damage to door 52.

Figure 2:
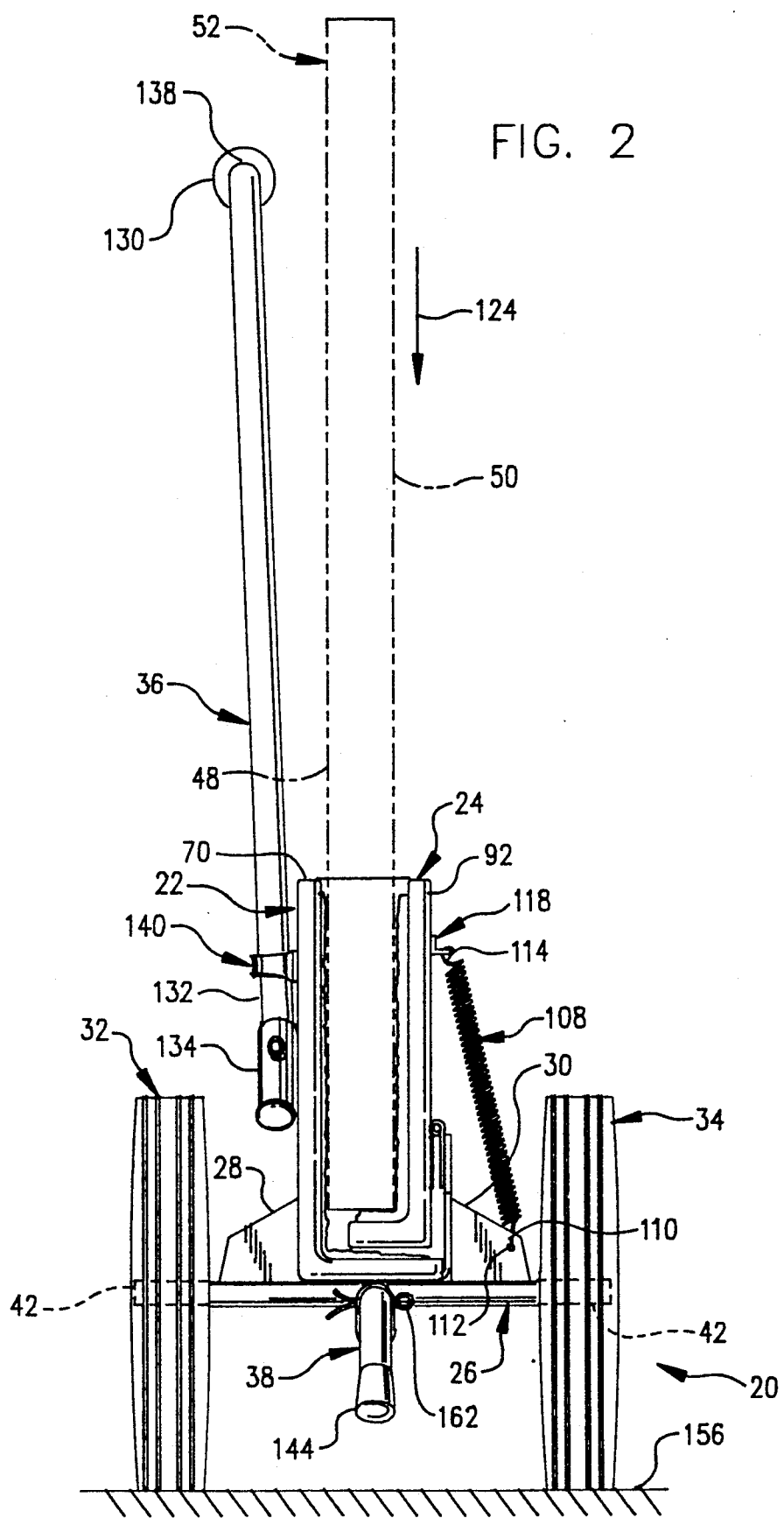
FIG. 2 is a front view of the cart.
Figure 3:
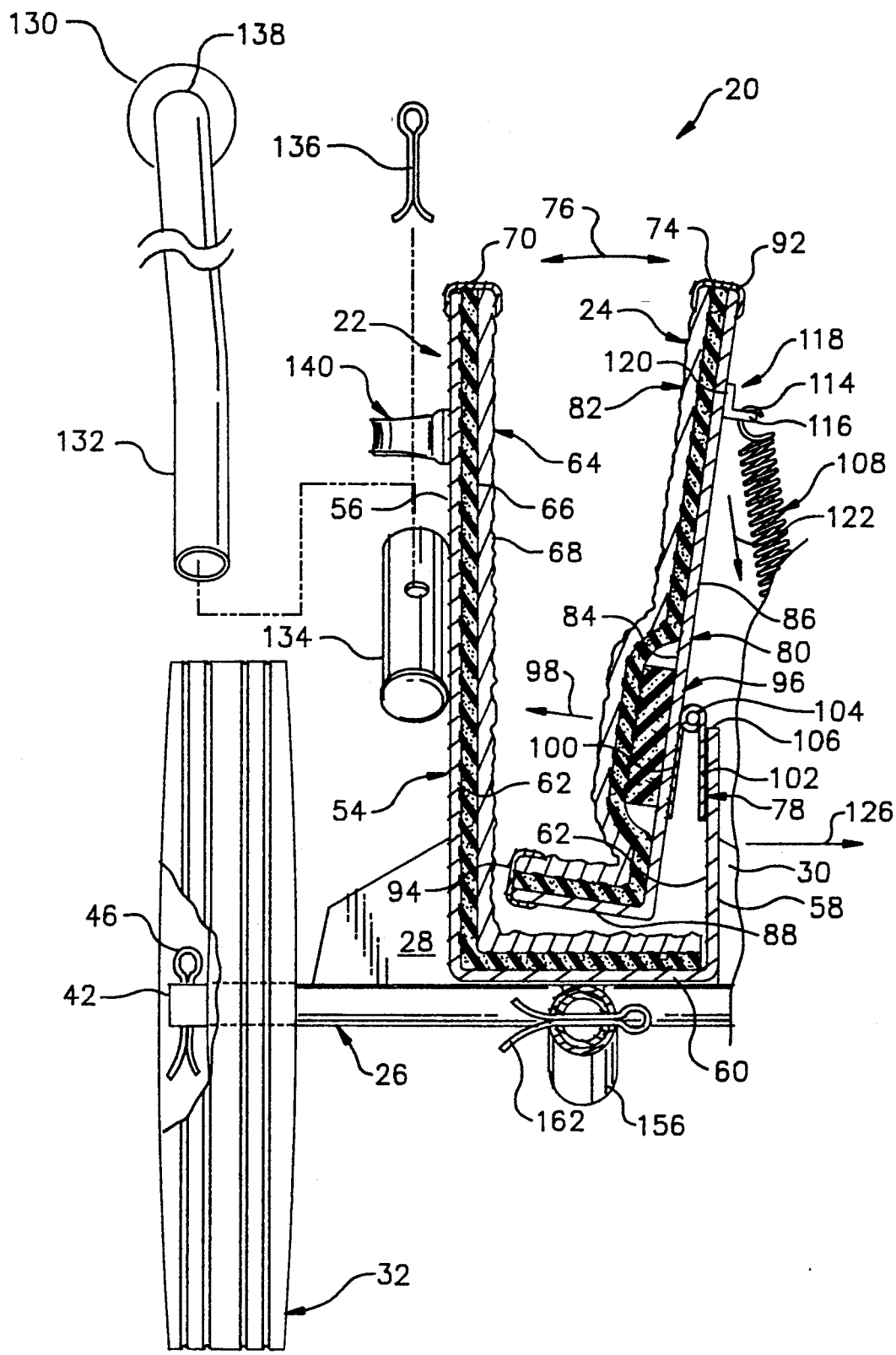
FIG. 3 is a fragmentary, partially exploded front view of the cart taken along line 3—3 of FIG. 4 and showing the details of selected cart components.

Referring now primarily to FIGS. 1–4, movable door cart jaw 24 is supported for pivotable movement of its upper end or edge 74 toward and away from fixed jaw vertical leg 56 about a fore-and-aft axis as indicated by the double headed arrow 76 in FIG. 3 by hinge 78.

Movable or displaceable door cart jaw 24 includes a rigid, also typically metallic, L-shaped structural component or support 80 faced with carpeting 82 of the character discussed above to protect door 52. Carpeting 82 covers the inner surface 84 of displaceable jaw support 80, extending as it does down over the vertical leg 86 of that component and along the normally oriented, integral, door-supporting, bottom leg or base 88 of the rigid jaw component 80. Additional protection to door 52 is again afforded by soft plastic or other protective caps assembled to the exposed edges of the rigid, displaceable jaw component 80. These caps are collectively identified in FIG. 3 by reference characters 92 and 94.

As is shown in FIG. 3, a sponge rubber or other resiliently compressible pad 96 is installed behind carpeting 82 toward the lower end of the vertical leg 86 of rigid jaw support component 80. This pad, which extends from the front to the rear of component 80, is compressed in the course of loading door 52 into cart 20. Pad 96 thereafter tends to restore to its noncompressed configuration in the direction indicated by arrow 98 in FIG. 3. This provides a clamping force which securely holds door 52 in place between door cart jaws 22 and 24.

The hinge 78 which supports displaceable jaw 24 for pivotable displacement of the character discussed above is an off-the-shelf item having leaves 100 and 102 pivotally connected by a pin 104. Leaf 102 is welded or otherwise fixed to the shorter, vertically extending leg 58 of rigid, fixed jaw component 54 with pivot pin 104 located closely above the upper edge 106 of that leg.

The associated leaf 100 of pin 78 is similarly attached to the vertically extending leg 86 of the displaceable jaw's rigid support component 80. It is so located that the door supporting, lower leg 88 of jaw component 80 is adjacent the carpeting with which the lower leg 60 of fixed jaw component 54 is faced but sufficiently far above that carpeting as to freely clear it as movable jaw 24 is displaced back and forth in the arrow 76 direction.

Displaceable door cart jaw 24 is biased to the "open" position shown in FIG. 3 to facilitate the loading of door 52 by a tension spring 108. A loop 110 at the bottom end of spring 108 is hooked into an aperture 112 in reinforcing gusset 30. A second loop 114 at the opposite, upper end of tension spring 108 is similarly hooked into an aperture (not shown) which is formed in the bottom leg 116 of an L-shaped bracket 118. This bracket has a second, normally oriented leg 120 fastened to the vertically extending leg 86 of displaceable jaw component 80. With spring 108 being of a length that places the spring under tension as shown in FIG. 3, the spring generates a force acting in the direction of arrow 122 that pivots displaceable door cart jaw 24 about the pin 104 of hinge 78 to the desired, and illustrated, open position.

Door 52 is loaded into cart 20 by lowering it into the gap between door cart jaws 22 and 24 as suggested by arrow 124 in FIG. 2. When the door reaches and exerts weight on the door supporting leg 88 of displaceable jaw component 80, a force with a vector acting in the direction indicated by arrow 126 in FIG. 3 is generated. That force pivots the upper end 74 of displaceable jaw 24 toward fixed jaw 22, securely clamping the door between the protective padding 64 on the fixed jaw and the protective padding 82 on the displaceable jaw with the latter also protecting the lower edge 128 of the door from damage.

Removal of door 52 is as easily accomplished. This is done by simply lifting the door out of the grasp of jaws 22 and 24. This is facilitated by the spring-assisted restoration of movable jaw 24 to the illustrated position as the weight of the door is removed from the door-supporting leg 88 of displaceable jaw component 80.

The handle 36 by which door cart 20 is manipulated is an elongated, tubular member with a soft rubber or other tactilely pleasing hand grip 130 at its upper end. The lower end portion 132 of the handle is installed in a supporting sleeve 134 and retained in placed as by the illustrated cotter key 136. This allows door cart 20 to be broken down into a more compact form for storage, packaging, shipment, or movement of the cart from one location to another.

The handle supporting sleeve 134 is welded or otherwise attached to the vertical leg 56 of the rigid jaw support component 54 at the illustrated angle. That elevates the rear end of the handle to a level convenient for a user with a bend indicated at 138 in the handle similarly orienting grip 130 at the angle most comfortable for a user.

Also attached to support component leg 56, typically immediately above sleeve 134, is a sheet metal handle 140. This handle can be used to pick up and move door cart 20 on those occasions when handle 36 is not installed or when carrying the cart up and down stairs or through muddy areas where wheeling the cart is inadvisable or impractical.

The remaining major components of door cart 20 are the two stabilizing or positioning legs 38 and 40 which keep door cart 20 from tipping beyond the specified limits in the fore-and-aft direction. This keeps the cart from being tipped to an extent which might result in damage to door 52.

Legs 38 and 40 are formed into an arcuate shape from tubular stock and capped with soft rubber or comparable, protective, non-marring feet 144 and 146 at their lower ends 148 and 150. The upper, inboard ends 152 and 154 of these legs are installed in the tubular fillings 156 and 158. These fittings extend in a fore-and-aft direction and are attached to the base 60 of fixed jaw component 54 midway between wheels 32 and 34 as by welding. Cotter keys 162 and 164 secure the legs in place.

Figure 4:
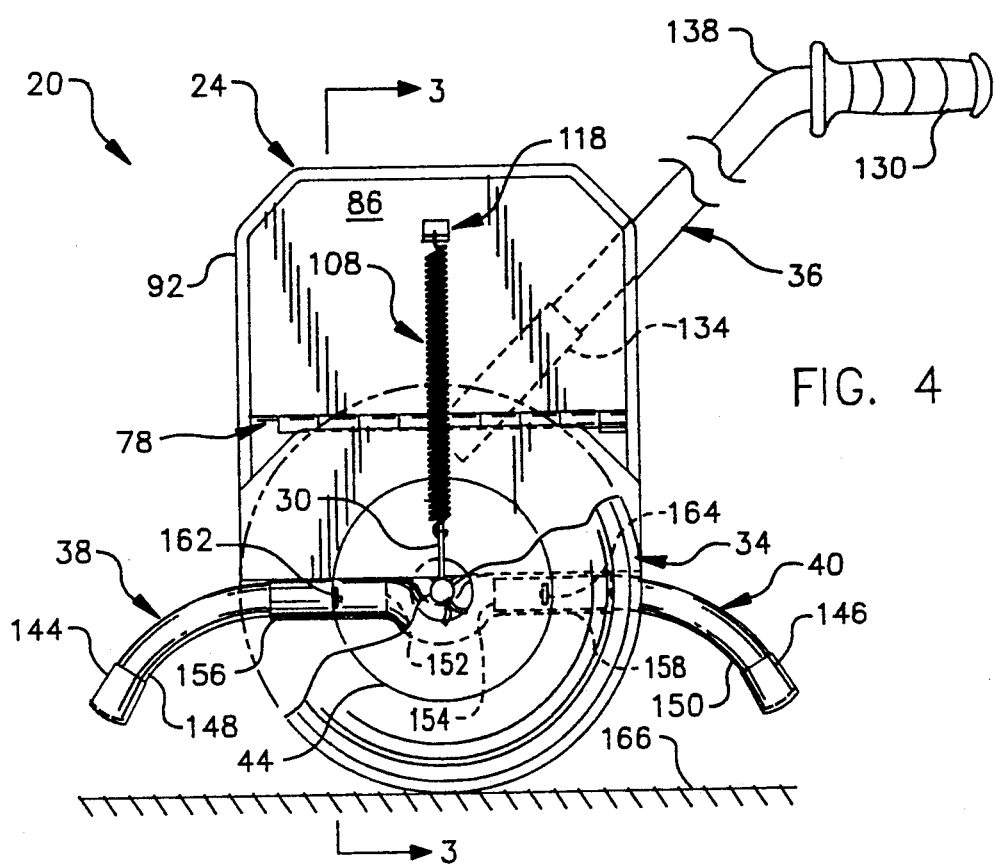
FIG. 4 is a left-hand side view of the cart.
Figure 5:
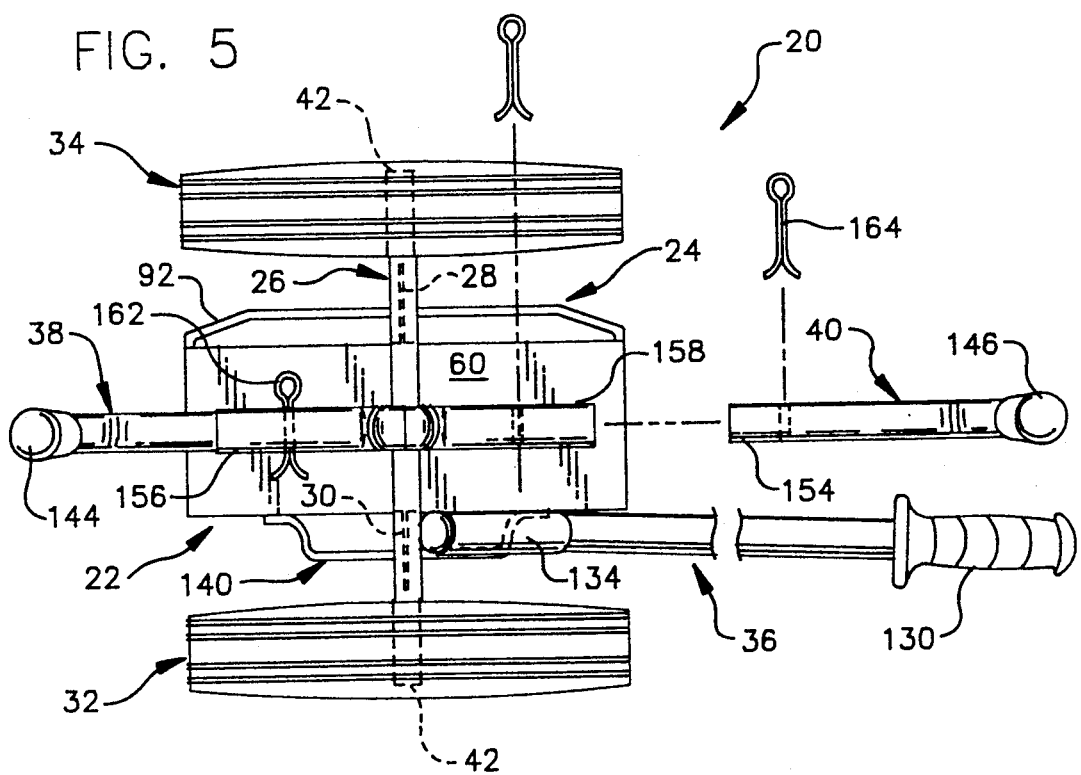
FIG. 5 is a partially exploded bottom view of the cart.

Referring now to FIG. 4, legs 38 and 40 are so configured and dimensioned that the feet 144 and 146 on the lower ends 148 and 150 of those legs clear the surface 166 along which door cart 20 is moved with that cart in its normal, operative position shown in FIG. 4.

The invention may be embodied in many forms without departing from the spirit or essential characteristics of the invention. The present embodiment is therefore to be considered in all respects as illustrative and not restrictive, the scope of the invention being indicated by the appended claims rather than by the foregoing description and the drawings; and all changes which come within the meaning and range of equivalency of the claims are therefore intended to be embraced therein.

What is claimed is:

1. A cart for moving objects from one location to another, said cart comprising:
   a mobile chassis which has an axle means;
   wheels supported from the axle means at the opposite ends thereof;
   a fixed jaw means which is supported by said chassis and has a vertically orientable segment engageable by an object loaded into the cart and a rigid support member with a vertically oriented base;
   a cooperating, movable jaw means which has: (a) a planar, vertically extending segment adapted to engage the opposite side of said object as it is loaded into the cart, said segment having an upper portion and a lower end; and (b) an object supporting actuator segment operative, as the object is loaded into the cart, to so displace the vertically extending segment of the movable jaw means as to securely clamp the object between that segment and the vertically extending segment of the fixed jaw means;
   front and rear legs which are engageable with a surface on which the cart is located to support the cart in a fore-and-aft direction and to limit the tipping of the cart in that direction;
   means which are oriented in the fore-and-aft direction and affixed to the bottom of said base and have sockets for said front and rear legs; and
   means for detachably securing said legs in place in said sockets.

2. A cart as defined in claim 1 also includes:
   an elongated handle for manipulating the cart;
   a handle-receiving socket means fixed to the vertically extending segment of the support means; and
   means for detachably securing said handle in said socket with the handle in an upwardly extending, fore-and-aft orientation.

3. A cart as defined in claim 1 which has front and rear legs which are engageable with a surface on which the cart is located to support the cart in a fore-and-aft direction and to limit the tipping of the cart in that direction.

* * * * *